US012083685B2

(12) United States Patent
Wu et al.

(10) Patent No.: US 12,083,685 B2
(45) Date of Patent: Sep. 10, 2024

(54) CONTROL SYSTEM AND CONTROL DEVICE

(71) Applicant: OMRON Corporation, Kyoto (JP)

(72) Inventors: Xianying Wu, Otsu (JP); Taku Oya, Higashimatsuyama (JP)

(73) Assignee: OMRON Corporation, Kyoto (JP)

( * ) Notice: Subject to any disclaimer, the term of this patent is extended or adjusted under 35 U.S.C. 154(b) by 672 days.

(21) Appl. No.: 17/262,227

(22) PCT Filed: Jul. 30, 2019

(86) PCT No.: PCT/JP2019/029848
§ 371 (c)(1),
(2) Date: Jan. 22, 2021

(87) PCT Pub. No.: WO2020/031790
PCT Pub. Date: Feb. 13, 2020

(65) Prior Publication Data
US 2021/0299872 A1    Sep. 30, 2021

(30) Foreign Application Priority Data
Aug. 6, 2018    (JP) .................... 2018-147368

(51) Int. Cl.
*B25J 9/16* (2006.01)
*B25J 9/00* (2006.01)
*B25J 11/00* (2006.01)

(52) U.S. Cl.
CPC .......... *B25J 9/1674* (2013.01); *B25J 9/0093* (2013.01); *B25J 9/1653* (2013.01); *B25J 9/1697* (2013.01); *B25J 11/0055* (2013.01)

(58) Field of Classification Search
None
See application file for complete search history.

(56) References Cited

U.S. PATENT DOCUMENTS

| 10,564,031 | B1* | 2/2020 | Stoia | G01H 3/08 |
| 11,301,978 | B2* | 4/2022 | Ikeda | G06T 7/136 |

(Continued)

FOREIGN PATENT DOCUMENTS

| CN | 1945483 | 4/2007 |
| CN | 103777623 | 5/2014 |

(Continued)

OTHER PUBLICATIONS

"Search Report of Europe Counterpart Application", issued on Mar. 9, 2022, p. 1-p. 9.

(Continued)

*Primary Examiner* — Peter D Nolan
*Assistant Examiner* — Jacob Kent Besteman-Street
(74) *Attorney, Agent, or Firm* — JCIPRNET

(57) ABSTRACT

A control system (1) according to the present invention comprises: a control device (100) that monitors the operation of a plurality of moving parts for machining a workpiece (155), and controls the operation of the plurality of moving parts in each control cycle by issuing command values to the plurality of moving parts; and an inspection device (200) for inspecting the workpiece (155). The control device (100) comprises: an identification unit (160) for identifying, based on inspection results of the inspection device (200) and the command values issued to the plurality of moving parts, which moving part from among the plurality of moving parts has caused an abnormality in the inspection results; and a storage unit (170) for collecting and storing data on the moving part that has been identified by the identification unit (160) and caused the abnormality in the inspection results.

6 Claims, 10 Drawing Sheets

(56) References Cited

U.S. PATENT DOCUMENTS

| | | | |
|---|---|---|---|
| 2007/0129914 A1 | 6/2007 | Yano et al. | |
| 2015/0243108 A1* | 8/2015 | Nakayama | H05K 13/083 702/81 |
| 2017/0089841 A1* | 3/2017 | Uemura | G06T 5/50 |
| 2017/0277174 A1 | 9/2017 | Maeda | |
| 2017/0308049 A1* | 10/2017 | Fujii | G05B 13/0265 |
| 2017/0308057 A1* | 10/2017 | Kreidler | G05B 19/4069 |
| 2021/0150700 A1* | 5/2021 | Wang | G06F 18/2415 |
| 2022/0057789 A1* | 2/2022 | Kitaoka | G05B 19/4183 |
| 2023/0173673 A1* | 6/2023 | Zhao | B25J 9/1687 700/245 |

FOREIGN PATENT DOCUMENTS

| | | |
|---|---|---|
| CN | 104685429 | 6/2015 |
| CN | 107848114 | 3/2018 |
| CN | 108227641 | 6/2018 |
| DE | 102015119240 | 3/2017 |
| EP | 2902861 | 8/2015 |
| JP | H0743352 | 2/1995 |
| JP | 2000207007 | 7/2000 |
| JP | 2002297221 | 10/2002 |
| JP | 2006261253 | 9/2006 |
| JP | 2012052931 | 3/2012 |
| JP | 2015152943 | 8/2015 |
| JP | 2015197396 | 11/2015 |
| JP | 2017199074 | 11/2017 |

OTHER PUBLICATIONS

"International Search Report (Form PCT/ISA/210) of PCT/JP2019/029848," mailed on Oct. 29, 2019, with English translation thereof, pp. 1-4.

"Written Opinion of the International Searching Authority (Form PCT/ISA/237) of PCT/JP2019/029848," mailed on Oct. 29, 2019, with English translation thereof, pp. 1-6.

"Office Action of China Counterpart Application", issued on Jan. 11, 2024, with English translation thereof, pp. 1-17.

* cited by examiner

CONTROL SYSTEM AND CONTROL DEVICE

CROSS-REFERENCE TO RELATED APPLICATION

This application is a 371 application of the International PCT application serial no. PCT/JP2019/029848, filed on Jul. 30, 2019, which claims the priority benefit of Japan Patent Application No. 2018-147368, filed on Aug. 6, 2018. The entirety of each of the above-mentioned patent applications is hereby incorporated by reference herein and made a part of this specification.

TECHNICAL FIELD

The present invention relates to a control system that monitors operations of a plurality of moving parts for performing predetermined processing on an object and a control device that controls the operations of the plurality of moving parts for performing the predetermined processing on the object in each control cycle by issuing command values and monitors the operations.

BACKGROUND ART

Recently in a variety of production sites, there has been a need for improving facility working rates through predictive maintenance on machines and devices such as robots. Predictive maintenance is a form of protection of performing repair work including maintenance, replacement, and the like by detecting a sign of any abnormality occurring in a machine or a device before a facility needs to be stopped.

In a case in which such predictive maintenance is to be realized relying on the experience and knowledge of managers of production sites, the degrees of the predictive maintenance realized according to the capabilities of the managers vary.

In addition, as mechanisms to realize predictive maintenance without relying on the experience and knowledge of managers, techniques of detecting a sign of an abnormality in a machine or a device by collecting data on the machine or the device have been proposed.

For example, Japanese Patent Laid-Open No. Hei 07-043352 (Patent Literature 1) discloses a method in which values of a plurality of diagnosis parameters of a group of diagnosis targets having properties divided into normal and abnormal properties are measured, the measured values are statistically processed, valid parameters and predicted diagnosis parameters are extracted from the processing results, determination levels are made based on the measured values of the extracted valid diagnosis parameters, and further a combination of the valid parameters and the determination levels are sequentially updated until a target correct answer rate is obtained.

CITATION LIST

Patent Literature

[Patent Literature 1]
  Japanese Patent Laid-Open No. Hei 07-043352

SUMMARY OF INVENTION

In the technique disclosed in Japanese Patent Laid-Open No. Hei 07-043352 described above, although a correct answer rate at which normality and abnormality are determined can be raised by statistically processing the measured values of the group of diagnosis targets, a large amount of resources are required to perform the statistical processing.

An objective of the present invention is to provide a technique to realize predictive maintenance with comparatively little resources.

According to an example of the present disclosure, a control system that monitors an operation of a plurality of moving parts for performing predetermined processing on an object is provided. The control system includes a control device that controls an operation of the plurality of moving parts in each control cycle by issuing command values to the plurality of moving parts and an inspection device that inspects the object, and the control device includes an identification unit that identifies, among the plurality of moving parts, a moving part that has caused an abnormality in inspection results of the inspection device based on the inspection results and the command values issued to the plurality of moving parts, and a storage unit that collects and stores data on the moving part that has been identified by the identification unit and caused the abnormality in the inspection results.

According to this disclosure, because data on all of the plurality of moving parts is not collected and only data on a moving part that has caused an abnormality is collected, the amount of resources required for realizing predictive maintenance can be reduced. Furthermore, the predictive maintenance can be more efficiently realized compared to a case in which data on all of the plurality of moving parts is collected.

In the above-described disclosure, the identification unit identifies a moving part that has caused an abnormality in the inspection results in addition to an operation period of the moving part, and the storage unit collects and stores data on the moving part that has caused an abnormality in the inspection results in the operation period identified by the identification unit.

According to this disclosure, because data on all operation periods of the plurality of moving parts is not collected and only data on an operation period of the moving part that has caused an abnormality is collected, the amount of resources required for realizing predictive maintenance can be reduced. Furthermore, the predictive maintenance can be more efficiently realized compared to a case in which data on operation periods of all of the plurality of moving parts is collected.

In the above-described disclosure, the plurality of moving parts includes a moving shaft included in any of a plurality of robots, the identification unit identifies a robot that has caused the abnormality in the inspection results among the plurality of robots, and the storage unit collects and stores data on the moving shaft included in the robot that has been identified by the identification unit and caused the abnormality in the inspection results.

According to this disclosure, because data on all of the plurality of robots is not collected and only data on a robot that has caused an abnormality is collected, the amount of resources required for realizing predictive maintenance can be reduced. Furthermore. the predictive maintenance can be more efficiently realized compared to a case in which data on all of the plurality of robots is collected.

In the above-described disclosure, the storage unit collects and stores data on a moving shaft whose torque value is abnormal among the moving shafts included in the robot that has caused the abnormality in the inspection results.

According to this disclosure, because data on all of the plurality of moving shafts included in the robot that has caused the abnormality is not collected and only data on a moving shaft that has an abnormal torque value is collected, the amount of resources required for realizing predictive maintenance can be reduced. Furthermore, the predictive maintenance can be more efficiently realized compared to a case in which data on all of the moving shafts included in the robot that has caused the abnormality is collected.

In the above-described disclosure, the plurality of moving parts includes an end effector included in any of the plurality of robots, the identification unit identifies a robot that has caused the abnormality in the inspection results among the plurality of robots. and the storage unit collects and stores data on the end effector included in the robot that has been identified by the identification unit and caused the abnormality in the inspection results.

According to this disclosure, because data on the end effectors of all of a plurality of robots is not collected and only data on an end effector of the robot that has caused an abnormality is collected, the amount of resources required for realizing predictive maintenance can be reduced. Furthermore, the predictive maintenance can be more efficiently realized compared to a case in which data on the end effectors of all of the plurality of robots is collected.

In the above-described disclosure, the plurality of moving parts includes a peripheral device of the robot that performs predetermined processing on the object, the identification unit identifies the peripheral device that has caused an abnormality in the inspection results, and the storage unit collects and stores data on the peripheral device that has been identified by the identification unit and caused the abnormality in the inspection results.

According to this disclosure, because data on all of the robots and the peripheral device is not collected and only data on a peripheral device that has caused an abnormality is collected, the amount of resources required for realizing predictive maintenance can be reduced. Furthermore, the predictive maintenance can be more efficiently realized compared to a case in which data on all of the robots and the peripheral device is collected.

According to another example of the present disclosure, a control device that controls an operation of a plurality of moving parts for performing predetermined processing on an object in each control cycle by issuing command values to the plurality of moving parts and monitors the operation is provided. The control device includes an identification unit that identifies, among the plurality of moving parts, a moving part that has caused an abnormality in inspection results of an inspection device that inspects the object based on the inspection results and the command values issued to the plurality of moving parts, and a storage unit that collects and stores data on the moving part that has been identified by the identification unit and caused the abnormality in the inspection results.

According to this disclosure, because data on all of the plurality of moving parts is not collected and only data on a moving part that has caused an abnormality is collected, the amount of resources required for realizing predictive maintenance can be reduced. Furthermore, the predictive maintenance can be more efficiently realized compared to a case in which data on all of the plurality of moving parts is collected.

The present invention can realize predictive maintenance with comparatively little resources.

DESCRIPTION OF EMBODIMENTS

Figure 1:
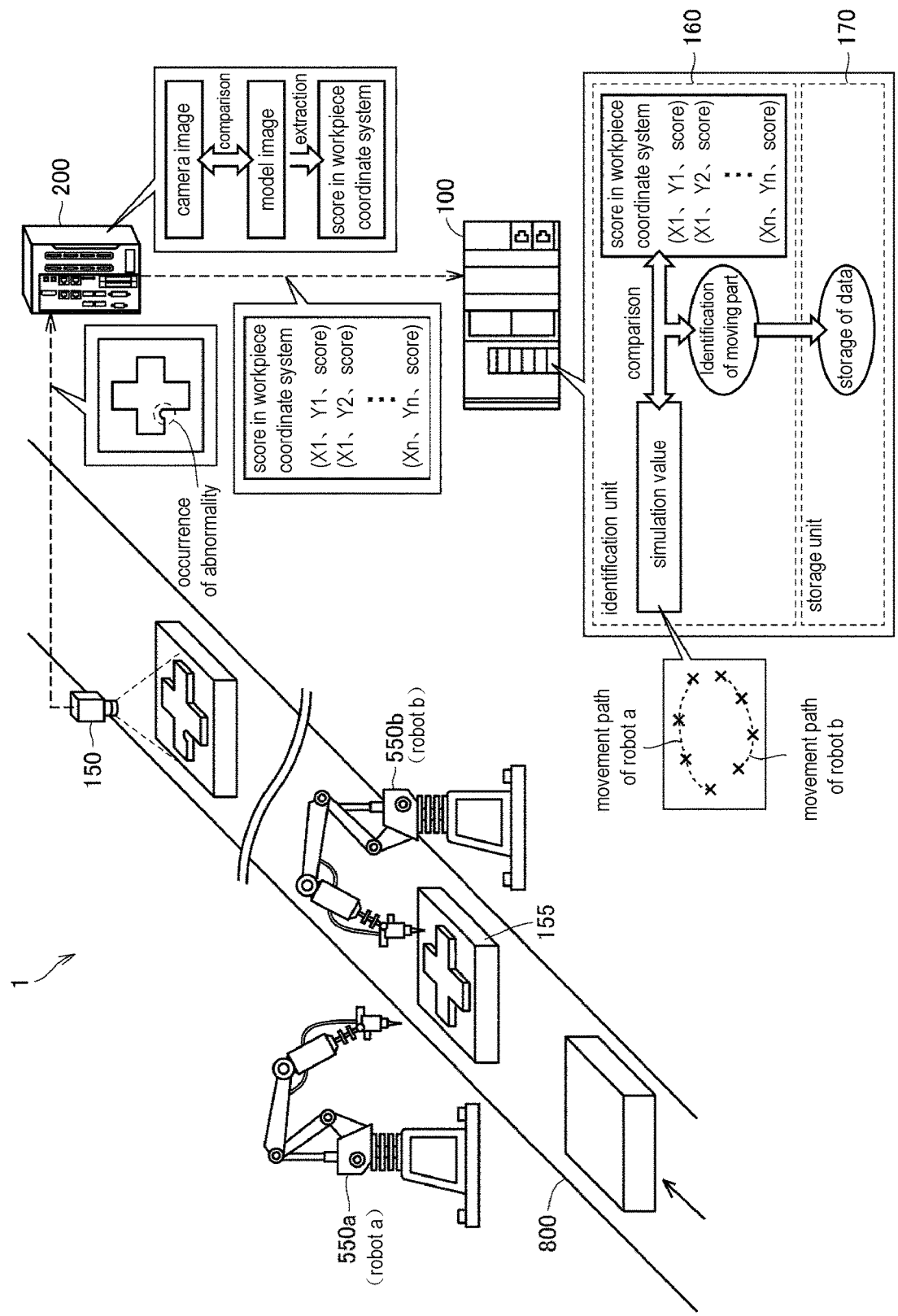
FIG. 1 is a schematic diagram for describing an application example of a control system according to the present embodiment.

Embodiments for implementing the present invention will be described in detail below with reference to the drawings. In addition, the same reference numerals will be given to the same or equivalent parts in the drawing, and description thereof will not be repeated.

<A. Application Example>

Figure 2:
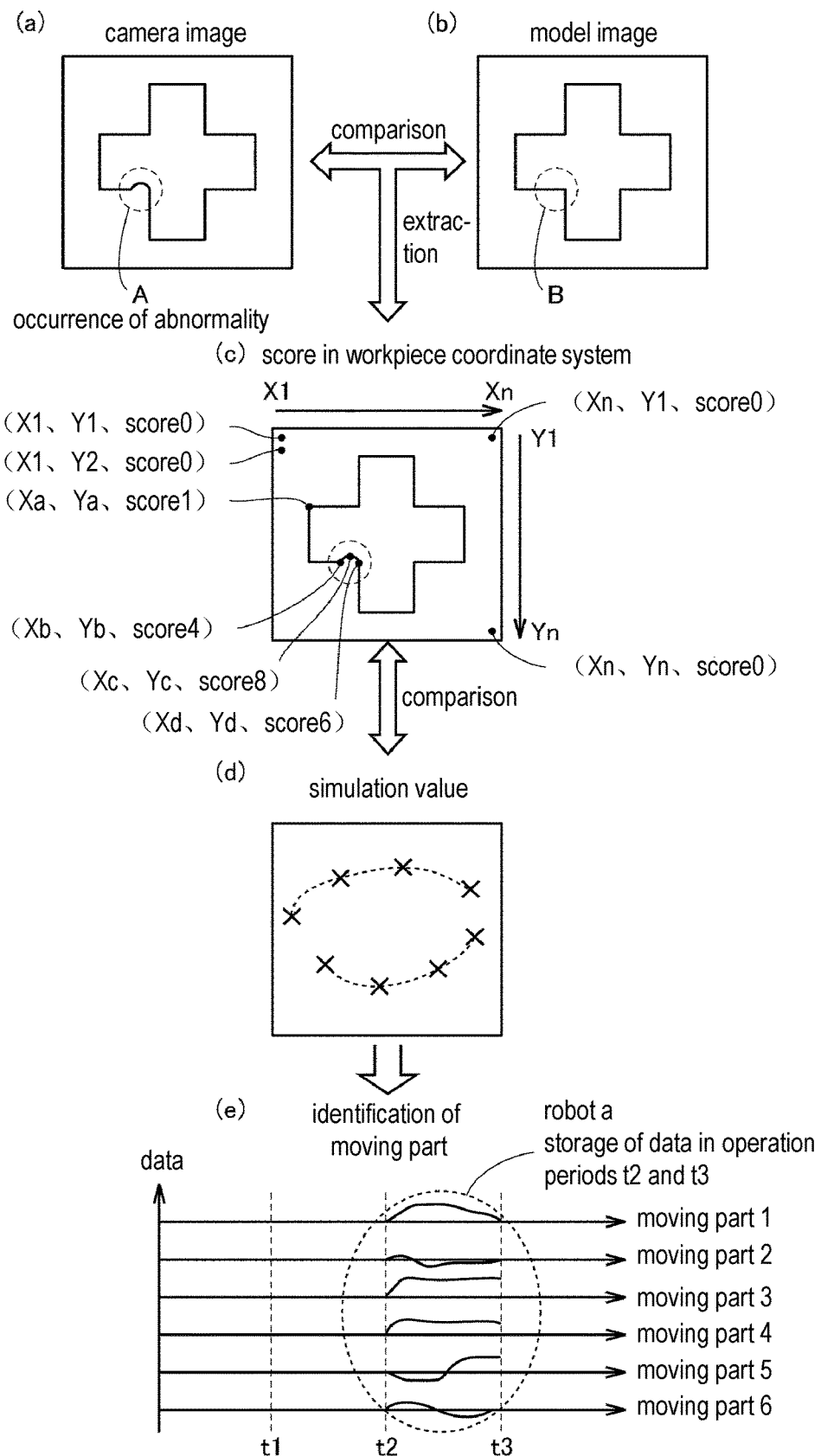
FIG. 2 is a schematic diagram for describing a specific example of processing details of the control system according to the present embodiment.

First, an example of a situation in which the present invention is applied will be described with reference to FIGS. 1 and 2. FIG. 1 is a schematic diagram for describing an application example of a control system 1 according to the present embodiment. FIG. 2 is a schematic diagram for describing a specific example of processing details of the control system 1 according to the present embodiment.

The control system 1 according to the present embodiment is applied to production sites of industrial products to monitor operations of a plurality of moving parts for performing predetermined processing on objects. In the present embodiment, a workpiece 155 is exemplified as an object as illustrated in FIG. 1. As the plurality of moving parts, a plurality of moving shafts of each of a robot 550*a* (which will be referred to as a robot a) and a robot 550*b* (which will be referred to as a robot b) and end effectors provided at the tips of arms of the robots a and b are exemplified. In addition, a plurality of moving parts is not limited to moving shafts and end effectors of robots, and may include any part that operates based on a command value from a control device. such as a peripheral device (e.g., an XY stage) of robots. The plurality of moving shafts and end effectors will be described below with FIG. 3. Further, an example of the peripheral device (e.g., an XY stage) will be described below with FIG. 10.

As the predetermined processing performed on an object, at least a part of processing or an operation performed when a product is manufactured may be exemplified. For example, processing performed by a robot to machine a workpiece 155 may be exemplified as the predetermined processing in FIG. 1. Further, the predetermined processing is not limited to machining, and may be assembly of a finished product or parts. An example of assembly will be described below with FIG. 11.

The control system 1 includes a control device 100 that controls operations of the plurality of moving parts of each of the robot a and the robot b in each control cycle by issuing command values to the plurality of moving parts and an inspection device 200 that inspects the workpiece 155. In the present embodiment, a programmable controller (PLC) is exemplified as the control device 100. As the inspection device 200, an image sensor that images the workpiece 155 using a camera 150 to inspect the workpiece 155 using a camera image acquired from the imaging is exemplified. Further, the inspection device 200 is not limited to an image sensor, and may be a device that allows inspection of the workpiece 155 based on any detection data, such as an optical sensor that allows inspection of the workpiece 155 by detecting light, a temperature sensor that inspects the workpiece 155 by detecting a temperature, a current sensor that inspects the workpiece 155 by detecting a current or a resistance value, or the like.

The workpiece 155 before cutting is transported by a conveyor 800 and then cut by the robot a and the robot b based on control of the control device 100 as illustrated in FIG. 1. A cross-shaped convex part is formed by cutting the workpiece 155. Then, the cut workpiece 155 is transported by the conveyor 800 again and the cut portion is imaged by the camera 150. A camera image acquired from imaging of the camera 150 is imported by the inspection device 200.

The inspection device 200 compares the acquired camera image with a model image registered in advance through pattern matching, or the like to inspect the external appearance of the cut portion (e.g., the cross-shaped convex part) of the workpiece 155. Then, the inspection device 200 extracts the score in a workpiece coordinate system as the result of the external appearance inspection and transmits the data to the control device 100.

The extraction of the score will be described with reference to FIG. 2. The surface of the cut workpiece 155 is shown in the camera image as illustrated in (a) of FIG. 2. On the other hand, a target surface of a workpiece to be obtained from cutting is shown in a model image registered in advance as illustrated in (b) of FIG. 2. In this example, the shape of a part A of the cut portion (the cross-shaped convex part) shown in the camera image is distinctly different from the shape of a part B of the cut portion (the cross-shaped convex part) shown in the model image.

The inspection device 200 compares the camera image with the model image through image processing such as pattern matching, or the like to calculate a degree of matching of the cut portions between the two images. Accordingly, a score is calculated as an index indicating a degree of matching at each set of coordinates in a camera coordinate system. Further, the camera coordinate system is a coordinate system uniquely defined in the camera image. In addition, the inspection device 200 converts the score at each set of coordinates in the camera coordinate system into a score at each set of coordinates in the workpiece coordinate system and thereby extracts the score in the workpiece coordinate system as illustrated in (c) of FIG. 2. Further, the workpiece coordinate system is a coordinate system uniquely defined in the workpiece 155.

In the workpiece coordinate system, the horizontal axis is defined as an X axis. and the vertical axis is defined as a Y axis. On the X axis. X1. X2. X3 . . . . . and Xn are determined from the left to the right of the workpiece coordinate system at equal intervals. On the Y axis, Y1, Y2, Y3 . . . . , and Yn are determined from the top to the bottom of the workpiece coordinate system at equal intervals. The score calculated based on the comparison of the camera image with the model image is extracted at each set of coordinates in the workpiece coordinate system. In this example, as the score becomes lower, the degree of matching between the camera image and the model image becomes higher, and on the other hand, as the score becomes higher, the degree of matching between the camera image and the model image becomes lower.

For example, the score at coordinates (X1. Y1) is 0. the score at coordinates (X1. Y2) is 0, the score at coordinates (Xn, Y1) is 0, and the score at coordinates (Xn, Yn) is 0. and the camera image completely matches the model image at these coordinates. In addition, the score at coordinates (Xa, Ya) is 1, and the camera image almost matches the model image at the coordinates.

Meanwhile, the score at coordinates (Xb, Yb) is 4, the score at coordinates (Xc, Yc) is 8, and the score at coordinates (Xd, Yd) is 6, and the degrees of match of the camera image and the model image at these coordinates are low. The reason for this is that the shape of the part A of the cut portion shown in the camera image is distinctly different from the shape of the part B of the cut portion shown in the model image as described above. The inspection device 200 calculates a score exceeding a threshold value among the scores at those coordinates as an abnormal value. For example, if the threshold value of scores is set to 3, each of the score 4 at coordinates (Xb, Yb), the score 8 at coordinates (Xc, Yc), and the score 6 at coordinates (Xd, Yd) are abnormal values.

Returning to FIG. 1. the scores in the workpiece coordinate system extracted as described above are transmitted from the inspection device 200 to the control device 100. The control device 100 includes an identification unit 160 that identifies a moving part that has caused an abnormality in inspection results among the plurality of moving parts based on the inspection results of the inspection device 200 and the command values issued to the plurality of moving parts. The above-described scores in the workpiece coordinate system are exemplified as the inspection results. In addition, as the command values issued to the plurality of moving parts, simulation values defining movement paths of the moving parts of each of the robots a and b may be exemplified. The simulation values are registered by the manager of the production site, or the like in advance.

The identification unit 160 of the control device 100 compares each score in the workpiece coordinate system acquired from the inspection device 200 with the simulation values to identify a moving part that was performing machining at a position on the workpiece 155 corresponding to the sets of coordinates at which the score has an abnormal value.

Furthermore, the control device 100 includes a storage unit 170 that collects and stores data on a moving part that has been identified by the identification unit 160 and caused an abnormality in the inspection results.

The storage of the data will be described again with reference to FIG. 2. The control device 100 identifies a moving part that has caused an abnormality in the inspection results by comparing the scores in the workpiece coordinate system illustrated in (c) of FIG. 2 and the simulation values illustrated in (d) of FIG. 2. For example, the control device 100 may identify a moving part of the robot a among the plurality of robots a and b as being abnormal and further identify the operation period of this moving part of the robot a.

For example, the control device 100 identifies the period from t2 to t3 as operation periods of a moving part 1 to a moving part 6 of the robot a that have caused the abnormality as illustrated in (e) of FIG. 2. Then, the control device 100 acquires data on the operations of the moving part 1 to the moving part 6 of the robot a in the period from t2 to t3 in each control cycle after the operation periods are identified and stores the data in a memory or the like.

The data collected as described above is used to realize predictive maintenance. For example, when there is a sign of an abnormality in the machined workpiece product, the manager of the production site, or the like can identify a moving part that has caused an abnormality based on the collected data, without relying on his or her own experience and knowledge as far as possible. In addition, the manager or the like can perform predictive maintenance including maintenance, replacement, and the like before the facilities need to be stopped by studying the cause of the sign of the abnormality based on the collected data.

In addition, because data on all of the plurality of moving parts is not collected and only data on a moving part that has caused an abnormality is collected, the amount of resources required for realizing predictive maintenance can be reduced. Furthermore, the predictive maintenance can be more efficiently realized compared to a case in which data on all of the plurality of moving parts is collected.

<B. Overall Configuration Example of Control System>

Figure 3:
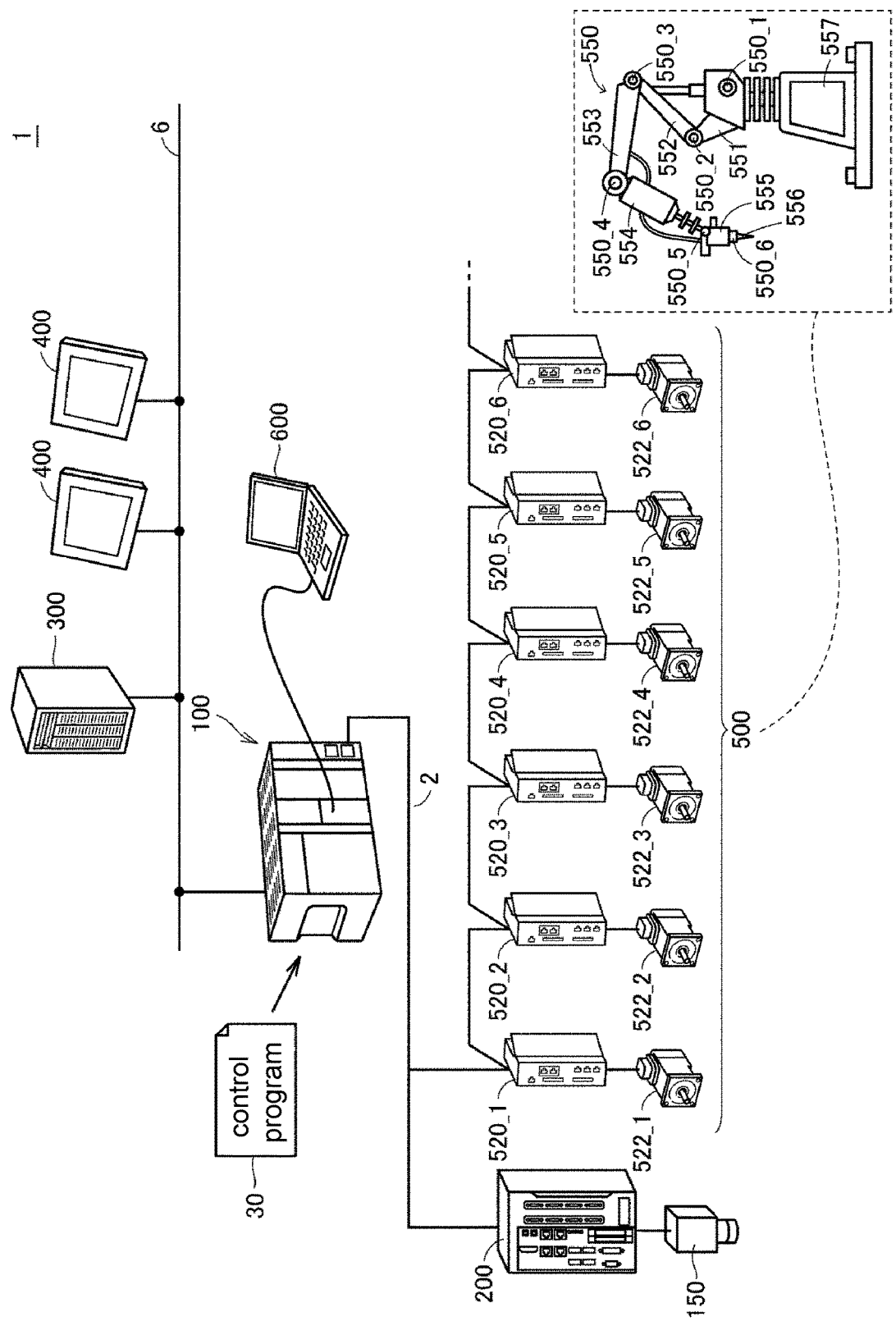
FIG. 3 is a schematic diagram for describing an overall configuration example of the control system according to the present embodiment.

Next, an overall configuration example of the control system 1 including the control device 100 according to the present embodiment will be described. FIG. 3 is a schematic diagram for describing an overall configuration example of the control system 1 according to the present embodiment.

The control device 100 corresponds to an industrial controller that controls control targets such as various facilities and devices. The control device 100 is a type of computer that executes control arithmetic operations and is typically embodied as a programmable controller (PLC). The control device 100 is connected to field devices 500 via a field network 2. The control device 100 exchanges data with one or a plurality of field devices 500 via the field network 2.

The control computational operations executed by the control device 100 includes processing of collecting data (input data) collected or generated by the field devices 500 (input processing), processing of generating data (output data) such as a command value or the like to be issued to the field device 500 (arithmetic operation processing), processing of transmitting the generated output data to the target field device 500 (output processing), and the like.

The field network 2 preferably employs a bus or a network for performing fixed cycle communication. As such a bus or a network for performing fixed cycle communication, EtherCAT (registered trademark). EtherNet/IP (registered trademark), DeviceNet (registered trademark), CompoNet (registered trademark), and the like are known. EtherCAT (registered trademark) is preferred in that the arrival time of data is guaranteed.

Any field device 500 can be connected to the field network 2. Each field device 500 includes an actuator that applies a certain physical effect to the robots. conveyors, and the like placed on the field side, an input/output device that exchanges information with the field side, and the like.

Although data is exchanged between the control device 100 and the field device 500 via the field network 2, the exchanged data is updated using a very short cycle time in an order of several hundreds of usec to several tens of msec.

In the configuration example illustrated in FIG. 3, the control device 100 controls a robot 550. The robot 550 corresponds to the robot a or the robot b illustrated in FIG. 1 described above.

The robot 550 is a processing device that performs cutting in the present embodiment as described above. Specifically, the robot 550 includes an arm constituted by a first arm 551, a second arm 552, a third arm 553, and a fourth arm 554, an end effector 555 provided at the tip of the arm, and a drill 556 attached to the end effector 555.

The first arm 551 is connected to a base 557 via a moving shaft 550_1 and moves around the axis of rotation of the moving shaft 550_1 with respect to the base 557. The second arm 552 is connected to the first arm 551 via a moving shaft 550_2 and moves around the axis of rotation of the moving shaft 550_2 with respect to the first arm 551. The third arm 553 is connected to the second arm 552 via a moving shaft 550_3 and moves around the axis of rotation of the moving shaft 550_3 with respect to the second arm 552. The fourth arm 554 is connected to the third arm 553 via a moving shaft 550_4 and moves around the axis of rotation of the moving shaft 550_4 with respect to the third arm 553. The end effector 555 is connected to the fourth arm 554 via a moving shaft 550_5 and moves around the axis of rotation of the moving shaft 550_5 with respect to the fourth arm 554. The drill 556 is connected to the end effector 555 via a moving shaft 550_6 and moves around the axis of rotation of the moving shaft 550_6 with respect to the end effector 555.

The robot 550 is driven according to command values from the control device 100. In the configuration example illustrated in FIG. 3, each field device 500 includes a plurality of servo drivers 520_1 to 520_6 and a plurality of servo motors 522_1 to 522_6 connected to the plurality of servo drivers 520_1 to 520_6, respectively.

The servo drivers 520_1 to 520_6 drive a corresponding servo motor among the servo motors 522_1 to 522_6 according to command values (e.g., a position command value, a speed command value, and the like) from the control device 100. When the servo motor 522_1 is driven, the moving shaft 550_1 rotates. When the servo motor 522_2 is driven, the moving shaft 550_2 rotates. When the servo motor 522_3 is driven. the moving shaft 550_3 rotates. When the servo motor 522_4 is driven, the moving shaft 550_4 rotates. When the servo motor 522_5 is driven, the moving shaft 550_5 rotates. When the servo motor 522_6 is driven, the moving shaft 550_6 rotates.

When each of the moving shafts 550_1 to 550_5 of the robot 550 configured as described above rotates, the arm constituted by the arms 551 to 554 operates within a predetermined operation range, and accordingly, the end effector 555 provided at the tip of the arm moves to a machining position of the workpiece 155. Then, when the moving shaft 550_6 rotates, the drill 556 attached to the tip of the end effector 555 rotates to cut the workpiece 155.

The above-described moving shafts 550_1 to 550_6 and end effector 555 are an example of the "moving part."

Further, the robot 550 is not limited to a device that performs cutting, and may be any machining device that performs lathe machining, milling machining, electrical discharge machining, or the like. In addition, the robot 550 may be an assembling device that assembles parts to the transported workpiece 155.

The control device 100 is connected to the inspection device 200 via the field network 2.

The inspection device 200 is connected to the camera 150 that images continuously transported workpieces 155. The camera 150 includes an optical system including a lens, a diaphragm, and the like, a light receiving sensor such as a charge coupled device (CCD) image sensor, a complementary metal oxide semiconductor (CMOS) image sensor, or the like, as main constituent components. The inspection device 200 is an image sensor that images the workpiece 155 with the camera 150 while illuminating the workpiece under control of the control device 100 in a production line for industrial products, or the like, and inspects the external appearance of the workpiece 155 using the obtained image.

The control device 100 is also connected to another device via an upper network 6. For the upper network 6, Ethernet (registered trademark) that is a general network protocol or EtherNet/IP (registered trademark) may be employed. More specifically, the upper network 6 may be connected to one or a plurality of server devices 300 and one or a plurality of display devices 400.

The server device 300 is assumed as a database system, a manufacturing execution system (MES), or the like. The manufacturing execution system is a system that acquires information from a manufacturing device or facility to be controlled and monitors and manages the entire production, and can handle order information, quality information, and shipping information, and the like. The configuration is not limited thereto, and a device that provides an information-based service may be connected to the upper network 6. The information-based service is assumed as processing of acquiring information from the manufacturing device or facility to be controlled and performing macro or micro analysis thereon, or the like. For example, a machine learning tool for performing data mining for extracting a certain trend in characteristics included in information from a manufacturing device or facility to be controlled or machine learning based on information from a facility or machine to be controlled, or the like may be assumed.

The display device 400 receives an operation from a user and outputs a command or the like according to the user operation to the control device 100, and graphically displays the arithmetic operation result of the control device 100.

A support device 600 can be connected to the control device 100. The support device 600 is a device that supports preparation required for the control device 100 to control a control target. Specifically, the support device 600 provides a development environment of a control program 30 executed by the control device 100 (a program creation/editing tool, a parser, a compiler, or the like), a configuration environment for setting configuration information (configuration) of the control device 100 and various devices connected to the control device 100, a function of outputting the generated control program 30 to the control device 100, a function of modifying and changing the control program 30 or the like executed by the control device 100 online, and the like. In the present embodiment, the manager, or the like can register a simulation value defining a movement path of a moving part of the robot 550 using the support device 600.

Although the control device 100, the support device 600, and the display device 400 are configured as separate parts in the control system 1 illustrated in FIG. 3, a configuration in which all or some of the functions are combined in a single device may be employed.

<C. Hardware Configuration Example of Control Device 100>

Figure 4:
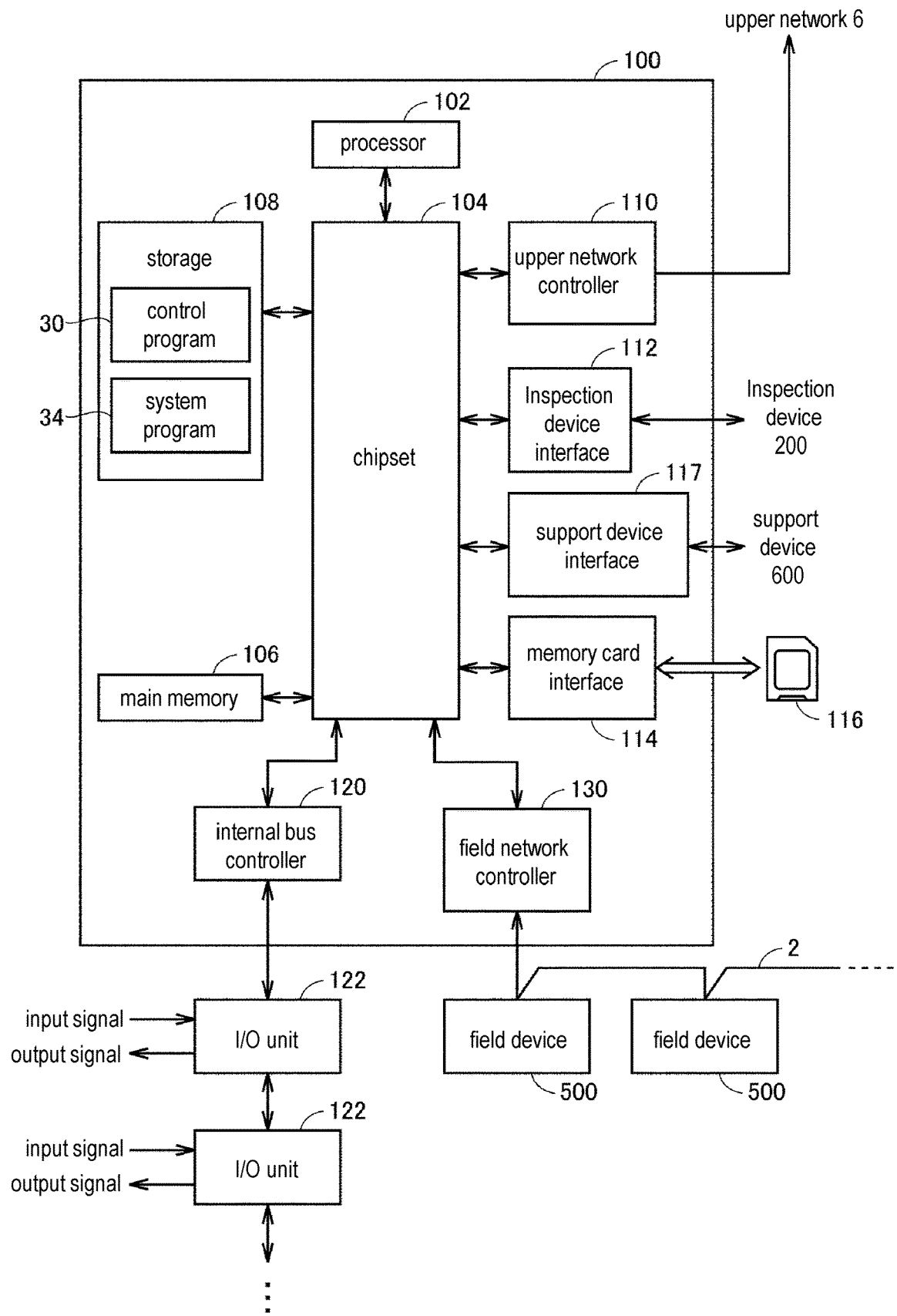
FIG. 4 is a block diagram for describing a hardware configuration example of a control device according to the present embodiment.

Next, a hardware configuration example of the control device 100 according to the present embodiment will be described. FIG. 4 is a block diagram for describing a hardware configuration example of the control device 100 according to the present embodiment.

As illustrated in FIG. 4, the control device 100 is an arithmetic operation processing part that is called a CPU unit, and includes a processor 102, a chipset 104, a main memory 106, a storage 108, an upper network controller 110, an inspection device interface 112, a support device interface 117, a memory card interface 114, an internal bus controller 120, and a field network controller 130.

The processor 102 is constituted by a central processing unit (CPU), a micro processing unit (MPU), a graphics processing unit (GPU), or the like. As the processor 102, a configuration with a plurality of cores may be employed, or a plurality of processors 102 may be disposed. The chipset 104 realizes overall processing of the control device 100 by controlling the processor 102 and peripheral elements.

The main memory 106 is constituted by a volatile storage device such as a dynamic random access memory (DRAM) or a static random access memory (SRAM). The main memory 106 is typically designated as a data storage destination of the storage unit 170 illustrated in FIG. 1.

The storage 108 is constituted by a non-volatile storage device, for example, a hard disk drive (HDD), a solid state drive (SSD), or the like. The processor 102 reads various programs stored in the storage 108, loads and executes the programs in the main memory 106, and thereby realizes control and various types of processing in accordance with control targets. The storage 108 stores the control program 30 created according to a manufacturing device or facility to be controlled in addition to a system program 34 for realizing basic functions.

The upper network controller 110 controls exchange of data with the server device 300, the display device 400, and the like via the upper network 6. The inspection device interface 112 controls exchange of data with the inspection device 200. The support device interface 117 controls exchange of data with the support device 600. Further, the support device 600 may be able to communicate with the control device 100 via a USB connection or through EtherNet communication.

The memory card interface 114 is configured to have a memory card 116 be detachable therefrom, and can write data into the memory card 116 and read various types of data (user program, trace data, and the like) from the memory card 116.

The internal bus controller 120 controls exchange of data with an I/O unit 122 mounted on the control device 100. The field network controller 130 controls exchange of data with the field devices via the field network 2.

Although a configuration example in which necessary functions are provided by the processor 102 executing programs is introduced in FIG. 4, some or all of the provided functions may be implemented using a dedicated hardware circuit (e.g., an ASIC, an FPGA, or the like). Alternatively, main units of the control device 100 may be realized using hardware following a generic architecture (e.g., an industrial PC based on a generic PC). In this case, a plurality of operating systems (OSs) for different uses may be executed in parallel, and at the same time, a necessary application may be executed on each OS using a virtualization technology.

<C. Hardware configuration example of inspection device 200>

Figure 5:
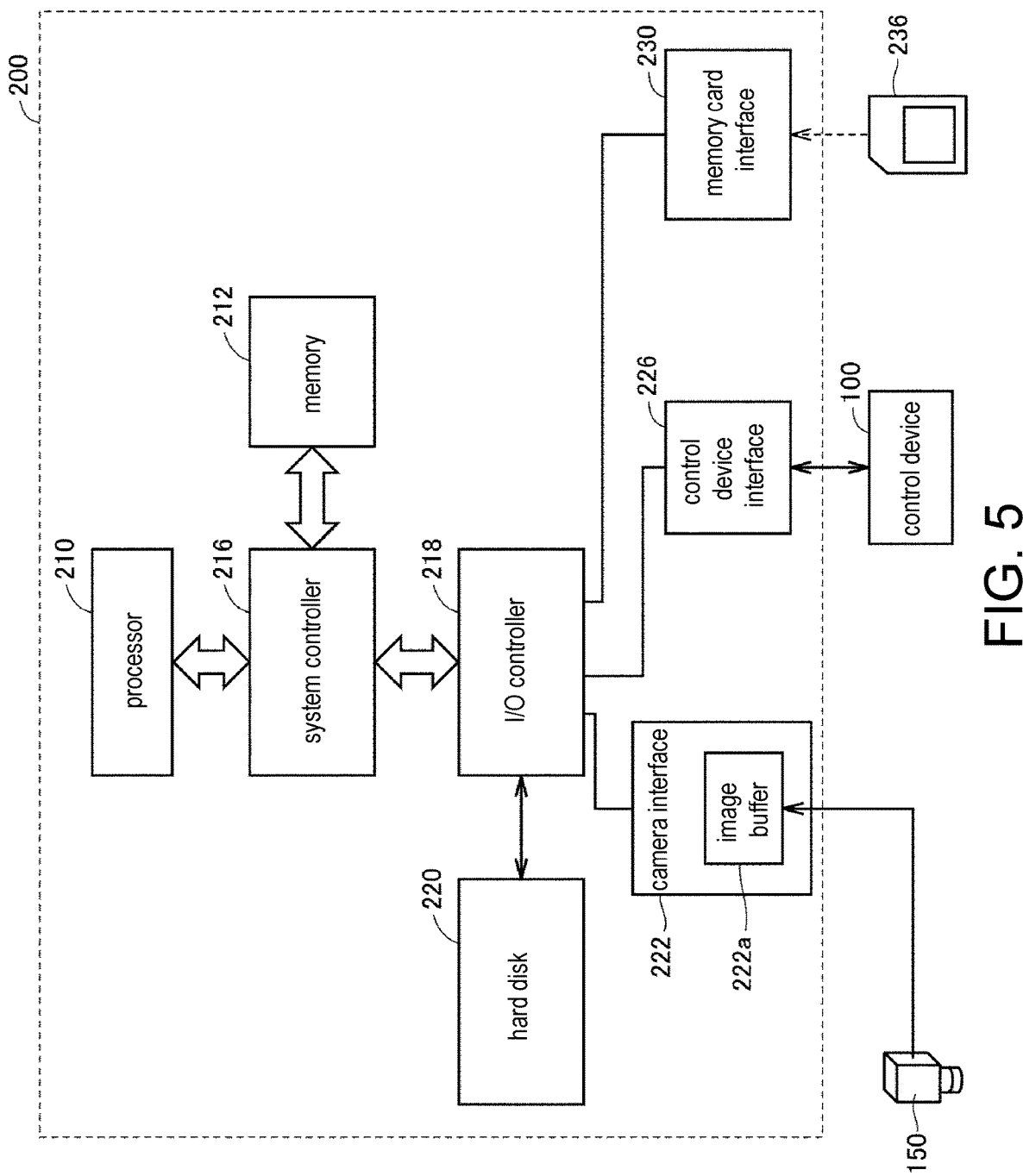
FIG. 5 is a block diagram for describing a hardware configuration example of an inspection device according to the present embodiment.

Next, a hardware configuration example of the inspection device 200 according to the present embodiment will be described. FIG. 5 is a block diagram for describing a hardware configuration example of the inspection device 200 according to the present embodiment.

As illustrated in FIG. 5, the inspection device 200 includes a processor 210, a memory 212, a system controller 216, an input/output (I/O) controller 218, a hard disk 220, a camera interface 222, a control device interface 226, and a memory card interface 230. These units are connected so as to communicate data with each other having the system controller 216 at the center.

The processor 210 is constituted by a central processing unit (CPU), a micro processing unit (MPU), a graphics processing unit (GPU), or the like. The processor 210 realizes desired arithmetic operation processing by exchanging programs (codes) with the system controller 216 and executing them in a predetermined order.

The system controller 216 is connected to the processor 210, the memory 212, and the I/O controller 218 via buses, respectively, to perform data exchange with each of the units, and the like and control processing of the entire inspection device 200.

The memory 212 is constituted by a volatile storage device such as a dynamic random access memory (DRAM) or a static random access memory (SRAM). The memory 212 retains programs read from the hard disk 220, data of camera image acquired by the camera 150, or the like. In addition, the memory 212 retains data of the model image used in the inspection of the external appearance, or the like.

The I/O controller 218 controls exchange of data with a recording medium connected to the control device 100 or an external apparatus. More specifically, the I/O controller 218 is connected to the hard disk 220, the camera interface 222, the control device interface 226, and the memory card interface 230.

The hard disk 220 is a typical non-volatile magnetic storage device, and stores various set values, and the like in addition to a control program such as an algorithm executed by the processor 210. In the present embodiment, as control programs installed in the hard disk 220, a program executed when the camera 150 is controlled to acquire a captured image of the workpiece 155 and a program executed when the external appearance of the workpiece 155 is inspected using the acquired captured image are exemplified. These control programs are distributed in a state in which the control programs are stored in the memory card 236, or the like. Further, instead of the hard disk 220, a semiconductor storage device such as a flash memory or an optical storage device such as a digital versatile disk random access memory (DVD-RAM) may be employed.

The camera interface 222 acquires camera images by imaging the workpiece 155 and mediates data transmission between the processor 210 and the camera 150. The camera interface 222 includes an image buffer 222a for temporarily accumulating data of the camera images from the camera 150.

The control device interface 226 mediates data transmission between the processor 210 and the control device 100.

The memory card interface 230 mediates data transmission between the processor 210 and the memory card 236 that is a recording medium. A program to be executed by the inspection device 200, or the like is distributed in a state in which the program is stored in the memory card 236, and the memory card interface 230 reads the program from the memory card 236. The memory card 236 includes a generic semiconductor storage device such as Secure Digital (SD), a magnetic recording medium such as a flexible disk, an optical recording medium such as a compact disk read only memory (CD-ROM), or the like. Alternatively, a program downloaded from a distribution server may be installed in the inspection device 200. Alternatively, some or all of functions provided through execution of a program may be implemented as a dedicated hardware circuit.

<E. Simulation Processing of Control Device 100>

Figure 6:
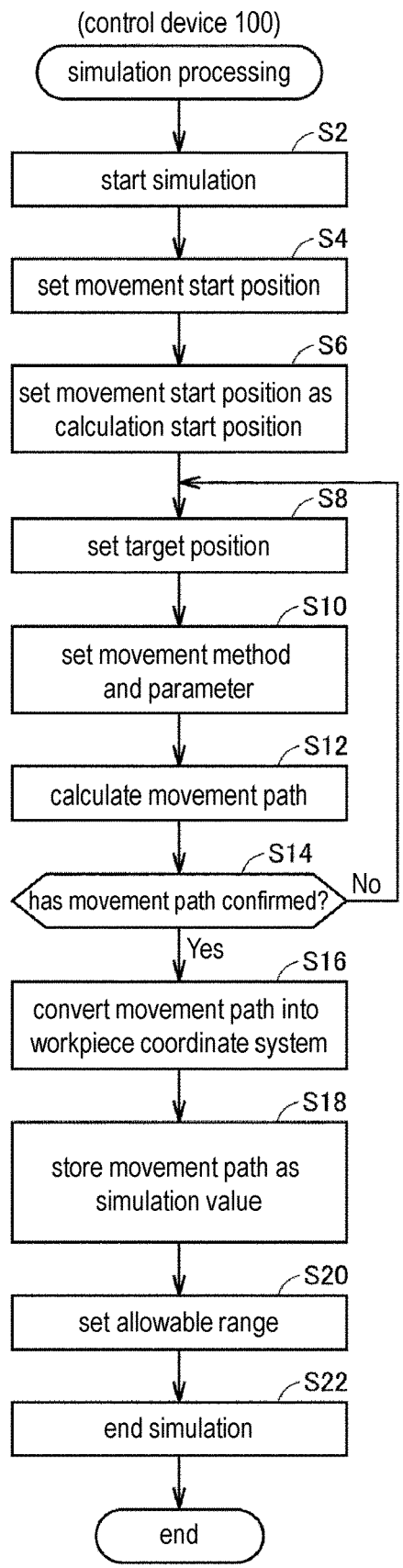
FIG. 6 is a flowchart showing simulation processing executed by the control device according to the present embodiment.

FIG. 6 is a flowchart showing simulation processing executed by the control device 100 according to the present embodiment. The control device 100 stores a simulation value defining a movement path of a moving part of the robot 550 by executing simulation processing based on an operation of the manager, or the like.

As shown in FIG. 6. the control device 100 starts simulation based on an operation of the manager, or the like (S2). The control device 100 first sets a movement start position of a moving part when simulation starts (S4). The movement start position of the moving part is designated by the manager, or the like. Then, the control device 100 sets the set movement start position of the moving part as a calculation start position (S6).

Next, the control device 100 sets a target position (S8). The target position of the moving part is designated by the manager, or the like. The control device 100 sets a movement method of the moving part and a parameter (S10). The movement method of the moving part and the parameter are designated by the manager, or the like. The control device 100 calculates a movement path between the calculation start position set in S6 and the target position set in S8 based on the movement method and the parameter set in S10 (S12).

The control device 100 determines whether the movement path has been confirmed with an operation of the manager, or the like (S14). The control device 100 executes the processing from S8 again if the movement path has not been confirmed (NO in S14). The control device 100 converts the confirmed movement path into coordinate values in the workpiece coordinate system (S16) if the movement path has been confirmed (YES in S14). Then, the control device 100 stores the movement path that has been converted into the coordinate values in the workpiece coordinate system as simulation values (S18).

The control device 100 sets an allowable range of the simulation values (S20). That is, the control device 100 adds a margin to the simulation values, considering that there can be a deviation in the movement path due to a change in the speed of the robot 550 or fine adjustment of a teaching point for the robot 550 to make the range covered by the robot 550. The allowable range of the simulation values is designated by the manager, or the like. Then, the control device 100 ends the simulation (S22), and ends the present processing.

<F. Score Calculation Processing of Inspection Device 200>

Figure 7:
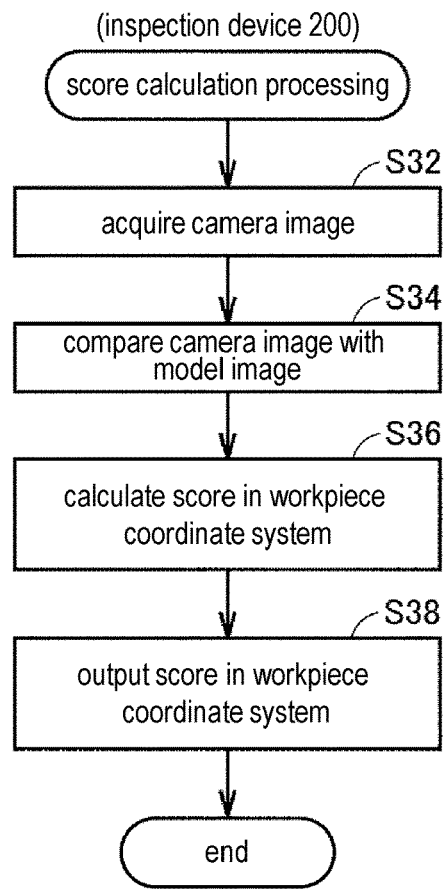
FIG. 7 is a flowchart showing score calculation processing executed by the inspection device according to the present embodiment.

FIG. 7 is a flowchart showing score calculation processing executed by the inspection device 200 according to the present embodiment. The inspection device 200 calculates a score in the workpiece coordinate system as a result of the external appearance inspection by executing score calculation processing each time the workpiece 155 is imaged.

As shown in FIG. 7, the inspection device 200 acquires a camera image by imaging the cut portion of the workpiece 155 with the camera 150 (S32). The inspection device 200 compares the acquired camera image with the pre-registered model image (S34).

The inspection device 200 calculates the score in the workpiece coordinate system based on the comparison of the camera image with the model image (S36). The inspection device 200 outputs the calculated score in the workpiece coordinate system to the control device 100 (S38). Then, the inspection device 200 ends the present processing.

<G. Cause Location Identification Processing of Control Device 100>

Figure 8:
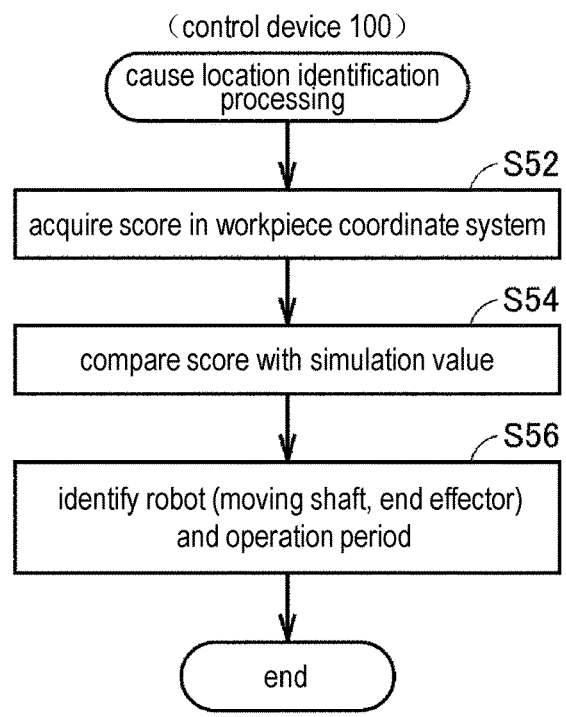
FIG. 8 is a flowchart showing cause location identification processing executed by the control device according to the present embodiment.

FIG. 8 is a flowchart showing cause location identification processing executed by the control device 100 according to the present embodiment. The control device 100 identifies a moving part that has caused an abnormality in the result of the external appearance inspection by executing cause location identification processing.

As shown in FIG. 8, the control device 100 acquires a score in the workpiece coordinate system output from the inspection device 200 (S52). The control device 100 compares the acquired score in the workpiece coordinate system with a simulation value (S54).

The control device 100 identifies the robot that has machined the workpiece 155 at the location corresponding to the coordinates at which the score matches the abnormal value and the operation period of the robot (S56). For example, the control device 100 identifies the robot 550 that has caused the abnormality among the plurality of robots 550. Furthermore, the control device 100 identifies the operation period of the robot 550 that has caused the abnormality. Then, the control device 100 ends the present processing.

<H. Data Storage Processing of Control Device 100>

Figure 9:
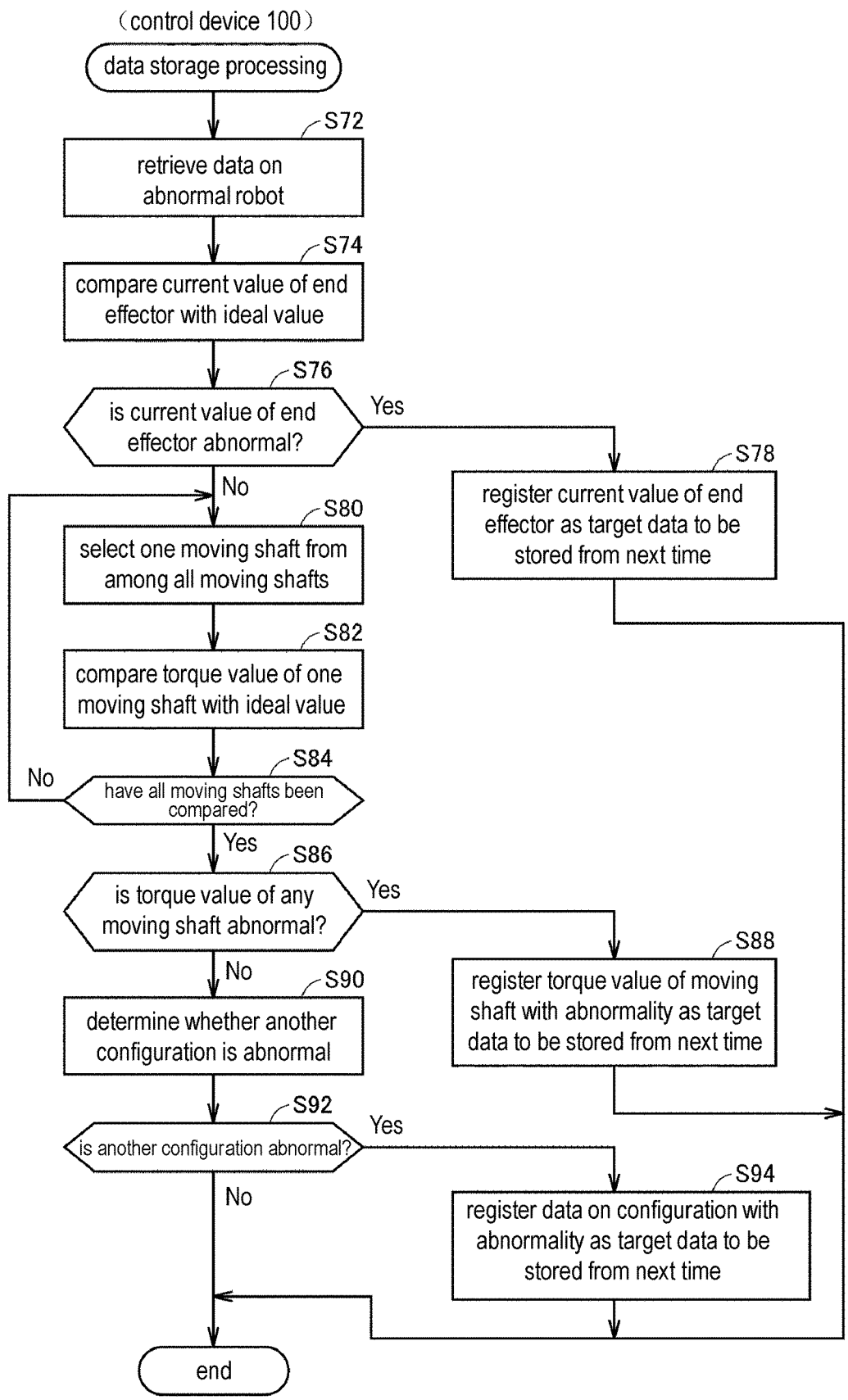
FIG. 9 is a flowchart showing data storage processing executed by the control device according to the present embodiment.

FIG. 9 is a flowchart showing data storage processing executed by the control device 100 according to the present embodiment. The control device 100 determines target data to be stored by executing data storage processing.

The control device 100 retrieves data on the robot 550 that has caused the abnormality as shown in FIG. 9 (S72). The control device 100 compares a current value of the end effector 555 included in the robot 550 that has caused the abnormality with a pre-registered ideal value (S74).

The control device 100 determines whether the current value of the end effector 555 is abnormal based on the comparison of the current value of the end effector 555 with the ideal value (S76). If the current value of the end effector 555 is abnormal (YES in S76), the control device 100 registers the current value of the end effector 555 as target data to be stored from the next time (S78). Then, in each control cycle thereafter, the current value of the end effector 555 in the operation period identified in S56 of FIG. 8 described above is stored in the main memory 106, or the like.

On the other hand, if the current value of the end effector 555 is not abnormal (NO in S76), the control device 100 selects one moving shaft among all of the moving shafts 550_1 to 550_6 included in the robot 550 that has caused the abnormality (S80). The control device 100 compares the torque value of the selected one moving shaft with a pre-registered ideal value (S82).

The control device 100 determines whether torque values of all of the moving shafts 550_1 to 550_6 have been compared with ideal values (S84). If the torque values of all of the moving shafts 550_1 to 550_6 have not been compared with the ideal values yet (NO in S84), the control device 100 executes the processing from S80 again.

On the other hand, if the torque values of all of the moving shafts 550_1 to 550_6 have been compared with the ideal values (YES in S84), the control device 100 determines whether the torque value of any moving shaft is abnormal based on the comparison results (S86). If the torque value of any moving shaft is abnormal (YES in S86), the control device 100 registers the torque value of the moving shaft with the abnormality as target data to be stored from the next time (S88). Thus, in each control cycle thereafter, the torque value of the moving shaft in the operation period identified in S56 of FIG. 8 described above is stored in the main memory 106, or the like.

On the other hand, if the torque value of any moving shaft is not abnormal (NO in S86), the control device 100 determines whether another configuration included in the robot 550 that has caused the abnormality is abnormal (S90). As the other configuration, each of the arms 551 to 554, the drill 556, each of the servo motors 522_1 to 522_6, and the like are exemplified. For example, the control device 100 determines whether abrasion of a brake of each of the servo motors 522_1 to 522_6 is abnormal.

If the other configuration is abnormal (YES in S92), the control device 100 registers the data related to the other configuration with the abnormality as target data to be stored from the next time (S94). Thus, in each control cycle thereafter, the data related to the other configuration in the operation period identified in S56 of FIG. 8 described above is stored in the main memory 106, or the like.

If the other configuration is not abnormal (NO in S92), the control device 100 ends the present processing after S78, S88, or S94.

I. Effects

As described above, in the control system 1 according to the present embodiment, the control device 100 identifies the robot 550 that has caused the abnormality based on the result of the external appearance inspection performed by the inspection device 200, and identifies the moving part that has caused the abnormality among the moving parts (e.g., the moving shafts 550_1 to 550_6 and the end effector 555) included in the identified robot 550. In addition, the control device 100 collects, in each control cycle from the next time, only data on the moving part that has caused the abnormality of the robot 550 that has caused the abnormality, instead of collecting data on all of the moving parts of all of the plurality of robots 550. Thus, resources for realizing predictive maintenance can be reduced. Furthermore, the predictive maintenance can be more efficiently realized compared to a case in which data on all of the plurality of moving parts is collected.

In the control system 1 according to the present embodiment, the control device 100 identifies the operation period of the robot 550 that has caused the abnormality based on the result of the external appearance inspection performed by the inspection device 200. In addition, the control device 100 collects, in each control cycle from the next time, data only in the operation period of the robot 550 that has caused the abnormality, instead of collecting data in all of the operation periods of the robot 550 that has caused the abnormality. Thus, resources for realizing predictive maintenance can be reduced. Furthermore, the predictive maintenance can be more efficiently realized compared to a case in which data in all of the operation periods of the plurality of moving parts is collected.

As described above, since the control device 100 identifies the robot 550 that has caused the abnormality and the moving part thereof and collects only data on the identified moving part based on the result of the external appearance inspection performed by the inspection device 200, predictive maintenance can be realized without relying on the experience and knowledge of the manager of the production site, or the like, as far as possible, and moreover, resources for the predictive maintenance can be comparatively reduced.

J. Modification Example

Although the inspection device 200 converts a score in the camera coordinate system into a score in the workpiece coordinate system and then outputs the score in the workpiece coordinate system to the control device 100, the inspection device 200 may output a score in the camera coordinate system to the control device 100 and the control device 100 may convert the score in the camera coordinate system into a score in the workpiece coordinate system in the present embodiment.

Although a score at the coordinates in the workpiece coordinate system is output to the control device 100, only a score in the workpiece coordinate system that has been determined as exceeding a threshold value and as an abnormality may be output to the control device 100 in the present embodiment.

Although the control device 100 may collect, in each control cycle from the next time, data on all of the moving parts included in the robot 550 that has caused an abnormality, resources for realizing predictive maintenance can of course be more reduced when collecting only data on the moving part that has caused an abnormality in each control cycle from the next time among the moving parts included in the robot 550 that has caused the abnormality, without collecting data on all of the moving parts of all of the plurality of robots 550 as in the present embodiment.

Although the robot 550 operates on the path according to the pre-registered simulation values in the present embodiment, the robot 550 may operate according to dynamically changing command values issued to the robot 550 in each control cycle based on a pre-set parameter. In this case, as a target to compare with a score in the workpiece coordinate system, the control device 100 may use operation data on the robot 550 calculated based on the path on which the robot 550 has operated, instead of a pre-registered simulation value.

The control device 100 may limit an operation speed or stop an operation of the robot 550 that has caused an identified abnormality and a moving part of the robot 550 based on the cause of the abnormality. For example, when a torque value of the moving shaft 550_1 among the moving shafts 550_1 to 550_6 is abnormal, the operation speed of the moving shaft 550_1 may be limited or the operation thereof may be stopped based on the torque value. Alternatively, when a current value of the end effector 555 is abnormal, the operation speed of the end effector 555 may be limited or the operation thereof may be stopped based on the current value.

Although the camera 150 is a separate body from the robot 550 in the present embodiment, the camera 150 may be attached at the hand of the robot 550, for example, the end effector 555, or the like.

The control device 100 is set to determine whether the end effector 555 is abnormal in preference to the moving shafts or other configurations as target data to be stored and sets only the end effector 555 as target data to be stored if the end effector is abnormal in the data storage processing illustrated in FIG. 9 in the present embodiment. The reason for this is that the end effector 555 is more likely to cause an abnormality than the moving shafts or other configurations. However, the embodiment is not limited thereto, and the control device 100 may determine whether a moving shaft or another configuration is abnormal in preference to the end effector 555, and if the moving shaft or the other configuration is abnormal, only the moving shaft or the other configuration may be set as target data to be stored. Alternatively, the control device 100 may determine whether any of the end effector 555, the moving shafts, and the other configurations is abnormal, and if any one is abnormal, data on the portion determined as being abnormal may be set as target data to be stored.

Figure 10:
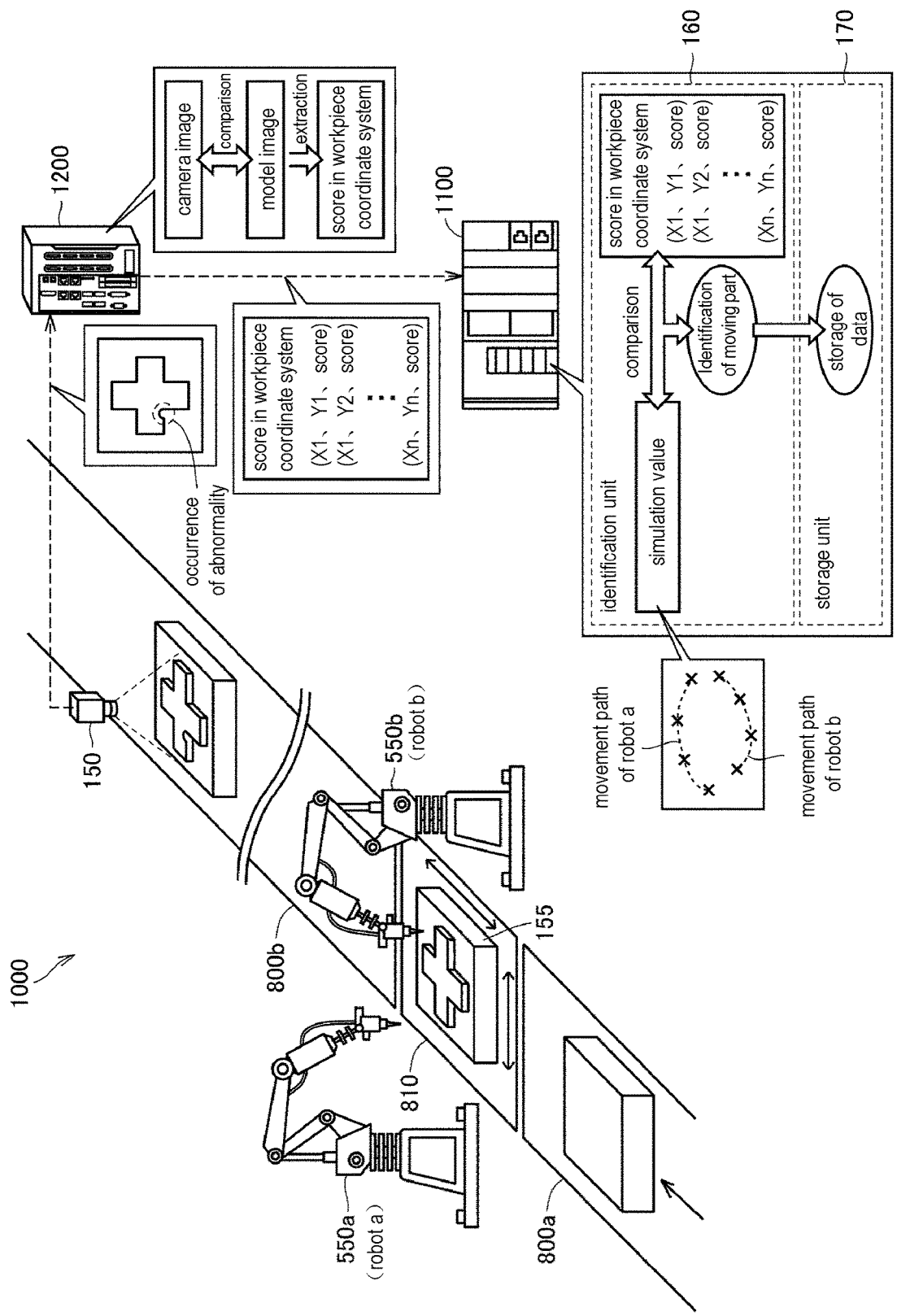
FIG. 10 is a schematic diagram for describing an application example of a control system according to a first modification example.

FIG. 10 is a schematic diagram for describing an application example of a control system 1000 according to a first modification example. The control system 1000 includes peripheral devices that support processing of robots a and b as moving parts in addition to the robots a and b as illustrated in FIG. 10. As a peripheral device. for example, an XY stage 810 for changing a position of a workpiece 155 as the stage moves in an X direction and a Y direction is exemplified in the example illustrated in FIG. 10. The workpiece 155 that has been transported by a conveyor 800a is machined by the robots a and b while the XY stage 810 changes the position of the workpiece, and then the workpiece is transported to the camera 150 side by a conveyor 800b.

The control system 1000 includes, in addition to the robots a and b, a control device 1100 that controls the moving parts of the robots by issuing a command value to the XY stage 810, and an inspection device 1200 that inspects the workpiece 155. The inspection device 1200 inspects the XY stage 810 and the external appearance of the workpiece 155 processed by the robots a and b. The control device 1100 identifies a moving part that has caused an abnormality in the inspection results based on the inspection results of the inspection device 1200 and the command values issued to the XY stage 810 and the robots a and b.

When a machining time slot in which an abnormality has occurred is ascertained based on a score in the workpiece coordinate system extracted by the inspection device 1200 and a simulation value, for example, if the XY stage 810 is not operating in the time slot, the control device 1100 can predict that the robot a or b has caused the abnormality. and if the XY stage 810 is operating in the time slot, the control device can predict that the cause of the abnormality is likely to be present in the XY stage 810 as well as the robots a and b. In addition, when a spot at which it is likely that the abnormality has caused is identified, the control device 1100 may collect and store data on the XY stage 810 or the robots a and b that have caused the abnormality to be able to be useful for predictive maintenance.

As described above, the control device 1100 may identify a peripheral device such as the XY stage 810 as the cause of the abnormality and collect data on the peripheral device. Further, the peripheral device is not limited to the XY stage 810 and may be a device that supports processing of the robots a and b.

Figure 11:
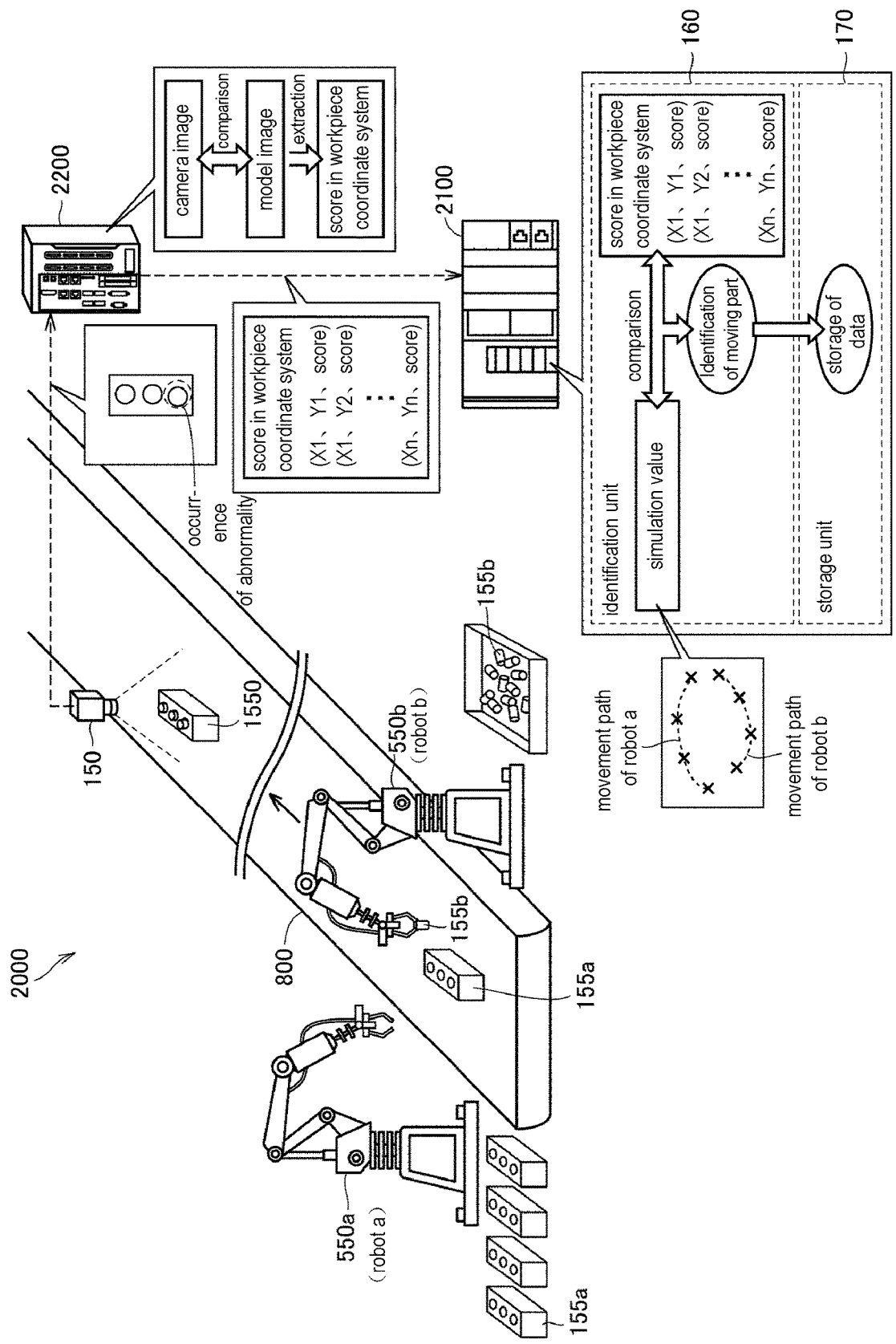
FIG. 11 is a schematic diagram for describing an application example of a control system according to a second modification example.

FIG. 11 is a schematic diagram for describing an application example of a control system 2000 according to a second modification example. Although an example in which the robots a and b machine the workpiece 155 has been described in the above-described example, the present disclosure can be applied to an example in which the robots a and b assemble a finished product or parts.

In the control system 2000, for example, the robot a takes a part 155a and places the part on a conveyor 800. Then, the robot b takes a part 155b and attaches the part to the part 155a. In this manner, an assembly 1550 is assembled by attaching the part 155*b* to the part 155*a* by the robots a and b. The assembly 1550 is transported to the camera 150 side by the conveyor 800.

The control system 2000 includes a control device 2100 that controls a plurality of moving parts by issuing command values to the robots a and b and an inspection device 2200 that inspects the assembly 1550. The inspection device 2200 inspects the external appearance of the assembly 1550 processed by the robots a and b. The inspection device 2200 inspects, for example, an attachment state of the part 155*b* or whether there is a scratch or dirt. The control device 2100 identifies a moving part that has caused an abnormality in the inspection results based on the inspection results of the inspection device 2200 and the command values issued to the robots a and b.

As described above, the assembly 1550 may be inspected by the inspection device 2200 and a moving part of the robot a or b that has assembled the assembly 1550 having an abnormality may be identified based on the inspection results.

K. Addendum

The above-described embodiments include the following disclosure.
(Configuration 1)
A control system (1) that monitors an operation of a plurality of moving parts (550_1 to 550_6 and 555) for machining an object (155), the control system includes a control device (100) that controls an operation of the plurality of moving parts in each control cycle by issuing command values to the plurality of moving parts, and an inspection device (200) that inspects the object, in which the control device includes an identification unit (160) that identifies, among the plurality of moving parts, a moving part that has caused an abnormality in inspection results of the inspection device based on the inspection results and the command values issued to the plurality of moving parts, and a storage unit (170) that collects and stores data on the moving part that has been identified by the identification unit and caused the abnormality in the inspection results.
(Configuration 2)
The control system described in configuration 1, in which the identification unit identifies a moving part that has caused the abnormality in the inspection results in addition to an operation period of the moving part, and the storage unit collects and stores data on the moving part that has caused the abnormality in the inspection results in the operation period identified by the identification unit.
(Configuration 3)
The control system described in configuration 1 or 2, in which the plurality of moving parts are moving shafts (550_1 to 550_6) included in any of a plurality of robots (550), the identification unit identifies a robot that has caused the abnormality in the inspection results among the plurality of robots, and the storage unit collects and stores data on the moving shaft included in the robot that has been identified by the identification unit and caused the abnormality in the inspection results.
(Configuration 4)
The control system described in configuration 3, in which the storage unit collects and stores data on a moving shaft whose torque value is abnormal among the moving shafts included in the robot that has caused the abnormality in the inspection results.

(Configuration 5)
The control system described in any of configurations 1 to 4, in which the plurality of moving parts includes an end effector (555) included in any of the plurality of robots, the identification unit identifies a robot that has caused the abnormality in the inspection results among the plurality of robots, and the storage unit collects and stores data on the end effector included in the robot that has been identified by the identification unit and caused the abnormality in the inspection results.
(Configuration 6)
The control system described in any of configurations 1 to 5, in which the plurality of moving parts includes a peripheral device (810) of the robot that performs predetermined processing on the object, the identification unit identifies the peripheral device that has caused the abnormality in the inspection results, and the storage unit collects and stores data on the peripheral device that has been identified by the identification unit and caused the abnormality in the inspection results.
(Configuration 7)
A control device (100) that controls an operation of a plurality of moving parts (550_1 to 550_6 and 555) for machining an object (155) in each control cycle by issuing command values to the plurality of moving parts and monitors the operation, in which the control device includes an identification unit (160) that identifies, among the plurality of moving parts, a moving part that has caused an abnormality in inspection results of an inspection device (200) that inspects the object based on the inspection results and the command values issued to the plurality of moving parts, and a storage unit (170) that collects and stores data on the moving part that has been identified by the identification unit and caused the abnormality in the inspection results.

Each of the embodiments disclosed this time should be considered as exemplary in all respects and not restrictive. The scope of the present invention is defined by the claims rather than the above description, and it is intended that all modifications within the meaning and scope equivalent to the claims are included. In addition, the inventions described in the embodiment and modification examples are intended to be implemented, either alone or in combination, wherever possible.

What is claimed is:

1. A control system that monitors an operation of a plurality of moving parts for performing predetermined processing on an object, the control system comprising:
a control device that controls an operation of the plurality of moving parts in a control cycle by issuing command values to the plurality of moving parts; and
an inspection device that inspects the object and compares an image of a processed part with a model image of the part to calculate a score indicating a degree of matching at each set of coordinates in a workpiece coordinate system,
wherein the control device comprises
an identification unit that identifies, among the plurality of moving parts, a moving part that has caused an abnormality by comparing each score in the workpiece coordinate system acquired by the inspection device with pre-registered simulation values to identify the moving part that was performing machining at a position on the workpiece corresponding to the sets of coordinates at which the score has an abnormal value, the simulation values defining movement paths of the moving parts, and a storage unit that collects and stores data regarding operations of the moving part that has been identified by the identification unit and caused the abnormality in the inspection result, wherein the identification unit identifies the moving part that has caused the abnormality in the inspection result in addition to an operation period of the moving part, and the storage unit collects and stores only data on the operation period of the moving part that has caused the abnormality in the inspection result identified by the identification unit.

2. The control system according to claim 1, wherein the plurality of moving parts are comprised in each of a plurality of robots, the plurality of moving parts comprises moving shafts comprised in each of the plurality of robots, the identification unit identifies a robot that has caused the abnormality in the inspection result among the plurality of robots, and the storage unit collects and stores data on the moving shaft comprised in the robot that has been identified by the identification unit and caused the abnormality in the inspection result.

3. The control system according to claim 2, wherein the storage unit collects and stores data on a moving shaft whose torque value is abnormal among the moving shafts comprised in the robot that has caused the abnormality in the inspection result.

4. The control system according to claim 1, wherein the plurality of moving parts are comprised in each of a plurality of robots, the plurality of moving parts comprises an end effector comprised in any of the plurality of robots, the identification unit identifies a robot that has caused the abnormality in the inspection result among the plurality of robots, and the storage unit collects and stores data on the end effector comprised in the robot that has been identified by the identification unit and caused the abnormality in the inspection result.

5. The control system according to claim 1, wherein the plurality of moving parts are comprised in each of a plurality of robots, the plurality of moving parts comprises a peripheral device of a robot that performs predetermined processing on the object, the identification unit identifies the peripheral device that has caused the abnormality in the inspection result, and the storage unit collects and stores data on the peripheral device that has been identified by the identification unit and caused the abnormality in the inspection result.

6. A control device that controls an operation of a plurality of moving parts for performing predetermined processing on an object in a control cycle by issuing command values to the plurality of moving parts and monitors the operation, the control device comprising:

an identification unit that identifies, among the plurality of moving parts, a moving part that has caused an abnormality by comparing each score in the workpiece coordinate system acquired by the inspection device with pre-registered simulation values to identify the moving part that was performing machining at a position on the workpiece corresponding to the sets of coordinates at which the score has an abnormal value, the simulation values defining movement paths of the moving parts; and a storage unit that collects and stores data regarding operations of the moving part that has been identified by the identification unit and caused the abnormality in the inspection result, wherein the identification unit identifies the moving part that has caused the abnormality in the inspection result in addition to an operation period of the moving part, and the storage unit collects and stores only data on the operation period of the moving part that has caused the abnormality in the inspection result identified by the identification unit.

* * * * *